UNITED STATES PATENT OFFICE.

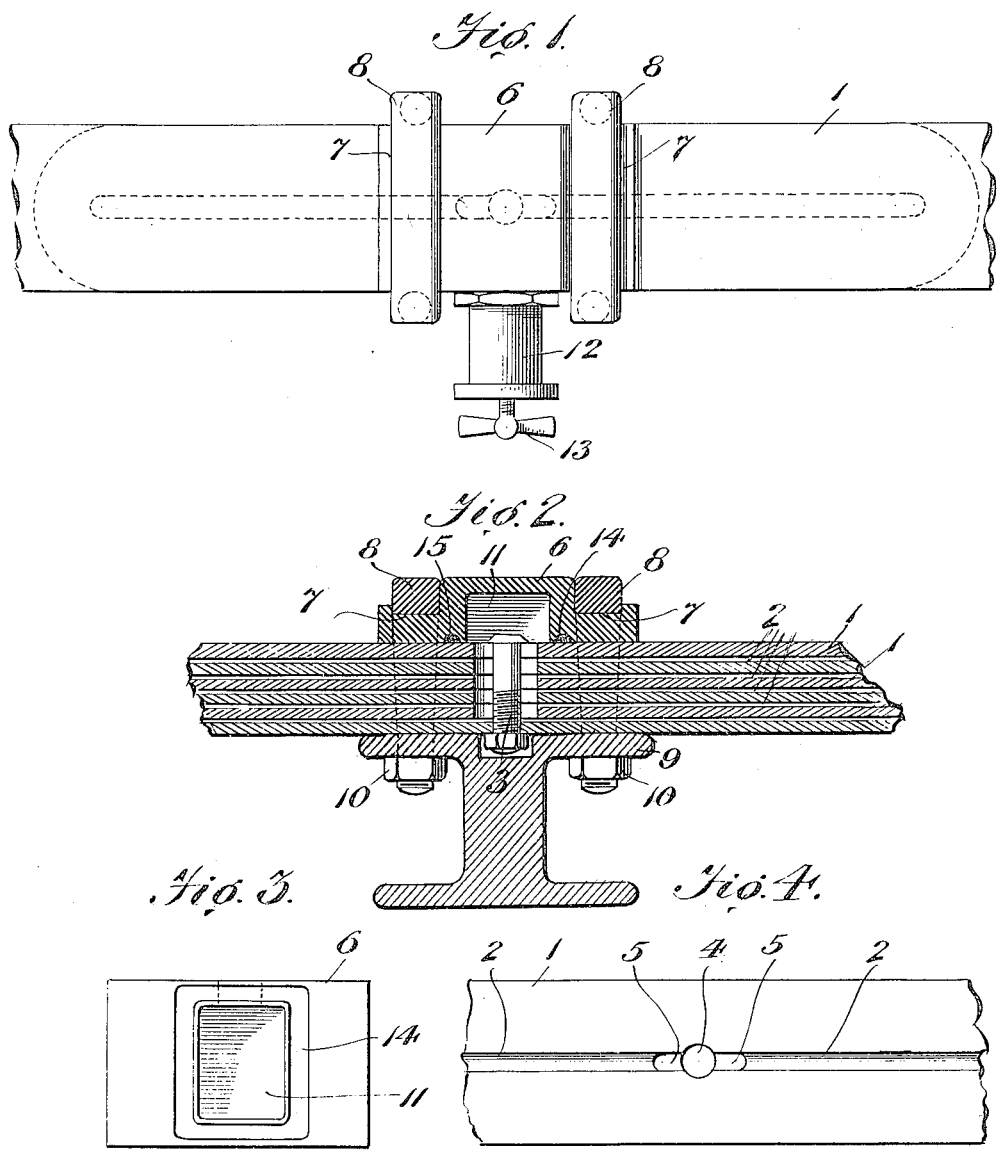

JOHN E. ANDERSON, OF CHICAGO, ILLINOIS, ASSIGNOR OF ONE-HALF TO WENDELIN P. SENG, OF CHICAGO, ILLINOIS.

LUBRICATOR FOR VEHICLE-SPRINGS.

1,224,256.      Specification of Letters Patent.      Patented May 1, 1917.

Application filed December 2, 1915, Serial No. 64,631. Renewed January 27, 1917. Serial No. 144,997.

*To all whom it may concern:*

Be it known that I, JOHN E. ANDERSON, a citizen of the United States, residing at Chicago, in the county of Cook and State of Illinois, have invented a new and useful Lubricator for Vehicle-Springs, of which the following is a specification.

My invention relates to a new and improved device designed to be applied to vehicle springs, more especially to those employed in automobiles, for the purpose of conveniently and thoroughly lubricating between the leaves thereof.

The objects and advantages of the invention together with the novel features thereof will hereinafter appear and be particularly pointed out in the appended claims.

Referring to the drawing—

Figure 1 is a plan view of a vehicle spring, the ends of which are broken away, showing my invention applied;

Fig. 2 is a vertical central longitudinal sectional view of the same;

Fig. 3 is an inverted plan view of the combined spring-saddle and lubricant-receptacle; and, Fig. 4 is a plan view of a portion of one of the spring-leaves.

Similar numerals of reference indicate similar parts in all the figures of the drawing.

In carrying out my invention, I prefer to employ a series of spring-leaves 1, each of which is provided in its upper side, with the exception of the upper, with a centrally located shallow groove 2, extending from near one end to near the opposite end. The leaves are held together by the usual tie-bolt 3, for the passage of which there is formed through the series of leaves the usual hole 4, or any other means may be employed for tying said leaves together, such forming no part of my invention. In the present instance, however, I have illustrated the invention in connection with spring-leaves thus tied, and, therefore, form at each side of the bolt-hole 4 mentioned, an aperture 5, which extends through each of the intermediate spring-leaves only. Of course, if the bolt 3 is not employed, one of such apertures only will be necessary, though more may be employed, if desired.

Surmounting the leaves thus assembled and occupying the usual position, is the clip-saddle 6, which, in this instance, is formed at each side of its center with clip-receiving grooves 7, in which are mounted the clips 8, the threaded terminals of which depend at and embrace the opposite sides of the spring and pass through openings in the clip-plate 9 of the axle below which are the usual nuts 10.

The underside of the saddle 6, between the clip-grooves 7, thereof, is provided with a lubricant-receiving chamber or cavity 11, the same on its open side being directly above and therefore communicating with the apertures 5, which latter it will be observed are in line with the shallow longitudinal grooves 2 of the spring-leaves. At one side, there may be threaded into the wall of this chamber an ordinary compression-cup 12, from which into said chamber lubricant may be conveniently forced by a threaded follower 13, or any other means may be substituted for filling said chamber 11.

In order to prevent the lubricant escaping from the chamber otherwise than through the apertures 5, it is desirable to form between the saddle and the uppermost spring-leaf of the series a tight joint. This may be accomplished in various ways, but I prefer to form the bottom of the wall of the chamber with a continuous groove 14, in which is located a fibrous packing 15. When thus constructed it will be seen that the nuts 10 serve to draw the saddle snugly upon the packing and form a tight joint.

The operation of my invention as well as its many advantages will be understood from the foregoing description. The lubricant, being introduced into the lubricating chamber 11, through any desired feed-means, will work its way down the apertures and spread laterally into the grooves 2 of the leaves and from the latter between the rubbing surfaces of the leaves, whereby the latter are constantly and efficiently lubricated. The advantages of a thorough lubrication of the leaves of a spring are too well-known and understood to require specific mention, but it might be well to state that the resiliency of the spring is greatly increased and the necessity of using the so-called shock-absorber for taking up the shocks in the road obviated. Moreover, where lubricated, rust cannot accumulate, and wear and breakage is reduced to a minimum. To keep springs thus provided in good ridable condition an occasional partial turn of the lubricating-feed is all that is necessary, such acting to supply the housing or lubricating-cavity with lubricant and the latter readily working into the spaces between the leaves. As before stated, the compression-cup may be omitted, and in its stead any other method of introducing lubricant into the chambered saddle substituted; and, indeed, other forms of lubricant receiving reservoirs may be used in connection with spring-leaves thus provided; the essence of the invention, therefore, consisting primarily, in a clip saddle having a lubricant receiving reservoir adapted to discharge the lubricant through some conveniently formed ducts to the rubbing-surfaces of the leaves.

I am aware that means have heretofore been provided for lubricating the rubbing-surfaces of spring-leaves, but all such as have come under my observation required the application of some form of auxiliary device for this purpose, usually in the way of an attachment to the spring. In my device, however, the clip-saddle, which is always and necessarily present as a means of connecting the spring to the axle, is modified or constructed to perform this function of a lubricant container or reservoir.

Having described my invention, what I claim, is:

1. The combination with the leaves of a vehicle-spring, having lubricating conductors between the rubbing surfaces thereof, a transverse conductor leading to said lubricating conductors, and a clip-saddle having an internal lubricant receiving reservoir formed therein and mounted on the spring, said reservoir communicating with said transverse conductor.

2. The combination with the leaves of a vehicle-spring, having a transverse lubricating duct through the same, of a clip-saddle mounted on the spring and having a reservoir therein communicating with said duct.

3. The combination with the leaves of a vehicle-spring, having a transverse lubricating duct through the same and lubricating conductors leading therefrom to the rubbing-surfaces of the leaves, of a clip-saddle provided with a lubricating reservoir or chamber communicating with said transverse lubricating duct.

4. The combination with the leaves of a vehicle-spring, having a transverse lubricating duct formed therein and each leaf on its upper side having a lubricating groove communicating with the transverse duct, of a clip-saddle provided with a lubricating chamber in its underside communicating with said transverse duct.

5. The combination with a vehicle-spring transversely perforated to form a lubricating duct, of a clip-saddle mounted over the perforation and having clip-receiving grooves and in its underside a lubricant receiving chamber or reservoir communicating with the said lubricating duct, clips mounted in the grooves and adapted to be received by the vehicle axle, and nuts on the ends of the clips.

6. The combination with a vehicle-spring transversely perforated to form a lubricating duct, of a clip-saddle mounted over the duct and provided in its underside with a lubricant-chamber or reservoir communicating with the duct and with a surrounding groove, clips embracing the saddle and springs and adapted to be received by the vehicle axle, and nuts on the ends of the clips.

7. The combination with a vehicle spring having a bolt-hole and at each side thereof transverse ducts, each of the leaves with the exception of the upper, having a longitudinal groove formed in its upper face, a tie-bolt in the bolt-hole, a clip-saddle mounted over the bolt and the said ducts and having a lubricant chamber communicating with the ducts and formed in its underside, opposite clips embracing the leaves and the saddle and adapted to be received by the vehicle axle, and nuts on the ends of the clips.

8. The combination with a vehicle-spring provided with lubricant ducts leading to the rubbing-surfaces of its leaves, of a clip-saddle mounted thereon and having a lubricant chamber formed therein and communicating with said ducts, and a compression-cup connected to the said chamber.

In testimony whereof I have signed my name to this specification in the presence of two subscribing witnesses.

JOHN E. ANDERSON.

Witnesses:
 GEO. F. HASSEL,
 FRANK J. SENG.